(12) United States Patent
Jiang et al.

(10) Patent No.: US 11,764,917 B2
(45) Date of Patent: *Sep. 19, 2023

(54) METHOD AND APPARATUS FOR PERFORMING FRACTIONAL SUBFRAME TRANSMISSION

(71) Applicant: NEC CORPORATION, Tokyo (JP)

(72) Inventors: Lei Jiang, Beijing (CN); Hongmei Liu, Beijing (CN); Gang Wang, Beijing (CN); Zhennian Sun, Beijing (CN); Chuangxin Jiang, Beijing (CN)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/483,130

(22) Filed: Sep. 23, 2021

(65) Prior Publication Data

US 2022/0038223 A1 Feb. 3, 2022

Related U.S. Application Data

(63) Continuation of application No. 16/927,525, filed on Jul. 13, 2020, now Pat. No. 11,159,285, which is a (Continued)

(51) Int. Cl.
*H04L 5/00* (2006.01)
*H04W 74/00* (2009.01)
(Continued)

(52) U.S. Cl.
CPC ............ *H04L 5/003* (2013.01); *H04L 5/0023* (2013.01); *H04L 5/0048* (2013.01);
(Continued)

(58) Field of Classification Search
CPC ..... H04L 5/003; H04L 5/0023; H04L 5/0048; H04L 5/0053; H04W 48/12; H04W 52/02;
(Continued)

(56) References Cited

U.S. PATENT DOCUMENTS 9,198,101 B2  11/2015  Lee et al.
9,326,157 B1   4/2016  Bhorkar et al.
(Continued)

FOREIGN PATENT DOCUMENTS

CN   101931501 A   12/2010
CN   102740473 A   10/2012
(Continued)

OTHER PUBLICATIONS

"Solutions for required functionalities and design targets", Qualcomm Incorporated, 3GPP TSG RAN WG1 #78bis, R1-144000, Oct. 6-10, 2014, (5 pages total).
(Continued)

*Primary Examiner* — Faruk Hamza
*Assistant Examiner* — Aixa A Guadalupe Cruz
(74) *Attorney, Agent, or Firm* — Sughrue Mion, PLLC

(57) ABSTRACT

Embodiments of the disclosure provide a method and apparatus for performing fractional subframe transmission. The method may comprise: in response to detecting that a channel becomes available, determining a target position from at least one potential position predefined in a subframe; and performing the fractional subframe transmission from the target position.

15 Claims, 5 Drawing Sheets

Related U.S. Application Data continuation of application No. 16/041,313, filed on Jul. 20, 2018, now Pat. No. 10,771,206, which is a continuation of application No. 15/644,147, filed on Jul. 7, 2017, now Pat. No. 10,063,356, which is a continuation of application No. 15/302,817, filed as application No. PCT/CN2015/071898 on Jan. 30, 2015, now Pat. No. 9,888,497.

(51) Int. Cl.
| | | |
|---|---|---|
| *H04W 74/08* | (2009.01) | |
| *H04W 52/02* | (2009.01) | |
| *H04W 72/0446* | (2023.01) | |
| *H04W 48/12* | (2009.01) | |
| *H04W 72/0453* | (2023.01) | |

(52) U.S. Cl.
CPC ............ *H04L 5/0053* (2013.01); *H04W 48/12* (2013.01); *H04W 52/02* (2013.01); *H04W 72/0446* (2013.01); *H04W 72/0453* (2013.01); *H04W 74/002* (2013.01); *H04W 74/0808* (2013.01); *H04W 74/0816* (2013.01); *Y02D 30/70* (2020.08)

(58) Field of Classification Search
CPC ......... H04W 72/0446; H04W 72/0453; H04W 74/002; H04W 74/0808; H04W 74/0816; Y02D 30/70
See application file for complete search history.

(56) References Cited

U.S. PATENT DOCUMENTS

| | | | |
|---|---|---|---|
| 9,332,465 | B2 | 5/2016 | Valliappan et al. |
| 9,408,168 | B2 | 8/2016 | Seo et al. |
| 10,306,662 | B2 | 5/2019 | Kim et al. |
| 2011/0103315 | A1 | 5/2011 | Camp, Jr. et al. |
| 2012/0176939 | A1 | 7/2012 | Qu et al. |
| 2012/0294229 | A1 | 11/2012 | Saito et al. |
| 2014/0003387 | A1 | 1/2014 | Lee et al. |
| 2014/0112289 | A1 | 4/2014 | Kim et al. |
| 2014/0126530 | A1 | 5/2014 | Siomina et al. |
| 2014/0140298 | A1 | 5/2014 | Han et al. |
| 2014/0341135 | A1 | 11/2014 | Bhushan et al. |
| 2015/0215905 | A1 | 7/2015 | Park et al. |
| 2015/0229451 | A1 | 8/2015 | Park et al. |
| 2016/0095114 | A1* | 3/2016 | Kim .................. H04W 74/0816 370/329 |
| 2017/0339588 | A1 | 11/2017 | Moon et al. |
| 2018/0115901 | A1 | 4/2018 | Harada et al. |
| 2018/0175975 | A1* | 6/2018 | Um ....................... H04L 1/1854 |
| 2018/0206129 | A1 | 7/2018 | Choi et al. |

FOREIGN PATENT DOCUMENTS

| | | | |
|---|---|---|---|
| CN | 104113914 | A | 10/2014 |
| CN | 104243115 | A | 12/2014 |
| CN | 104301273 | A | 1/2015 |
| JP | 2015070335 | A | 4/2015 |
| JP | 2018174583 | A | 11/2018 |
| RU | 2454817 | C2 | 2/2012 |
| WO | 2011/093095 | A1 | 8/2011 |
| WO | 2012/022370 | A2 | 2/2012 |
| WO | 2014/054901 | A1 | 4/2014 |
| WO | 2014/054902 | A1 | 4/2014 |
| WO | 2014052806 | A1 | 4/2014 |
| WO | 2014123340 | A1 | 8/2014 |
| WO | 2014136682 | A1 | 9/2014 |
| WO | 2016/122756 | A1 | 8/2016 |

OTHER PUBLICATIONS

Communication dated Feb. 19, 2018 from the Russian Patent Office in application No. 2016141273.
Communication dated Feb. 27, 2019 from the Intellectual Property India Office in application No. 201617042466.
Communication dated Jan. 3, 2020, from the European Patent Office in application No. 19195699.4.
Communication dated Jul. 31, 2019 from the Japanese Patent Office in application No. 2016-564159.
Communication dated Jun. 29, 2018 from the Canadian Intellectual Property Office in application No. 2943557.
Communication dated Mar. 5, 2019 from The Patent Office of the People's Republic of China in application No. 201580030376.X.
Communication dated May 23, 2019 from the Canadian Intellectual Property Office in application No. 2943557.
Communication dated May 6, 2020, issued by the Canadian Intellectual Property Office in application No. 2,943,557.
Communication dated Oct. 17, 2016 from the Canadian Intellectual Property Office in counterpart Application No. 2,943,557.
Communication dated Oct. 17, 2017 issued by the Japanese Patent Office in counterpart application No. 2016-564159.
Communication dated Sep. 29, 2017 from the European Patent Office in application No. 15879400.8.
Intel Corporation, Discussion on PHY layer options for LAA using LTE, 3GPP TSG-RAN WG1#79 R1-144666, Nov. 21, 2014, 6 pages.
International Search Report for PCT/CN2015/071898 dated Nov. 2, 2015 [PCT/ISA/210].
Kyocera, Further considerations on the essential functionalities for LAA, 3GPP TSG RAN WG1 R1-144955, Nov. 17-21, 2014, 10 pages.
Nokia Corporation, LAA LBT operation using Reservation signals, 3GPP TSG RAN WG1 #79, R1-145004, Nov. 17-21, 2014, 4 pages.
Patent Search Report dated Mar. 5, 2019 from the State Intellectual Property Office of the P.R.C. in application No. 201580030376.X.
Communication dated May 30, 2017 issued by the Federal Institute of Industrial Property of the Federal Service of Industrial Property, Patent and Trade Marks of Russia in counterpart application No. 2016141273.
Communication dated Jun. 30, 2020 from the Japanese Office in application No. 2019-096210.
Communication dated Nov. 6, 2020 from the Indian Intellectual Property Office in Application No. 201617032020.
Communication dated Feb. 25, 2021, from the Canadian Intellectual Property Office in Application No. 2,943,557.
Communication dated Feb. 2, 2021, from the Japanese Patent Office in Application No. 2019-096210.
Chinese Office Action for CN Application No. 201911126308.X dated Feb. 17, 2022 with English Translation.

* cited by examiner

METHOD AND APPARATUS FOR PERFORMING FRACTIONAL SUBFRAME TRANSMISSION

CLAIM FOR PRIORITY

This application is a Continuation of U.S. patent application Ser. No. 16/927,525 filed on Jul. 13, 2020, which is a Continuation of U.S. patent application Ser. No. 16/041,313 filed on Jul. 20, 2018, (now U.S. Pat. No. 10,771,206, Issued Sep. 8, 2020), which is a continuation application of U.S. patent application Ser. No. 15/644,147, filed Jul. 7, 2017 (now U.S. Pat. No. 10,063,356, Issued Aug. 28, 2018), which is a continuation application of U.S. patent application Ser. No. 15/302,817, filed Oct. 7, 2016, (now U.S. Pat. No. 9,888,497, Issued Feb. 6, 2018) which is a 371 of International Application PCT/CN2015/071898, filed Jan. 30, 2015, all of which are incorporated by reference herein.

FIELD OF THE INVENTION

Embodiments of the present invention generally relate to communication techniques. More particularly, embodiments of the present invention relate to a method and apparatus for performing fractional subframe transmission.

BACKGROUND OF THE INVENTION

In 3rd Generation Partnership Project (3GPP), the network structure and various technologies needed for a terminal's movement between a 3GPP wireless communication network and a Wireless Local Area Network (WLAN) network are called interworking WLAN. The multi-mode wireless communication technology has evolved to use multiple wireless communication technologies at the same time. The use of multiple wireless communication technologies simultaneously thereby increases transfer rates per unit time or improves the reliability of the terminal.

In wireless communication, the spectrum is very rare resource. A licensed band represents a frequency band that is exclusively licensed to a specific operator to provide specific wireless services. On the other hand, an unlicensed band represents a frequency band that is not allocated to a specific operator, but is opened so that all entities meeting the predefined requirements may use the frequency band.

In some regions in the world, unlicensed band technologies need to abide to certain regulations, for example, Listen-Before-Talk (LBT), and channel bandwidth occupancy requirements. LBT results in an uncertainty of channel availability. For instance, an unlicensed band may be available at any time during a subframe.

WLAN that uses Wireless Fidelity (WiFi) is the typical wireless communication technology used in the unlicensed band. Time granularity of current Long Term Evolution (LTE) is much larger than that of WiFi, which leads to the low competitive strength of License Assisted Access (LAA) with LBT. As such, fair coexistence between LTE and other technologies such as WiFi as well as between LTE operators is expected.

In order to be more competitive in the unlicensed band, there is a need to perform fractional subframe transmission with low signaling overhead and high resource utilization.

SUMMARY OF THE INVENTION

The present invention proposes a solution regarding fractional subframe transmission. Specifically, the present invention provides a method and apparatus for fractional subframe transmission with low signaling overhead and high resource utilization.

According to a first aspect of embodiments of the present invention, embodiments of the invention provide a method for performing fractional subframe transmission. The method may comprise: in response to detecting that a channel becomes available, determining a target position from at least one potential position predefined in a subframe; and performing the fractional subframe transmission from the target position. The method may be performed at a transmitter.

According to a second aspect of embodiments of the present invention, embodiments of the invention provide a method for performing fractional subframe transmission. The method may comprise: determining a target position from at least one potential position predefined in a subframe, the fractional subframe transmission starting at the target position; and receiving the fractional subframe transmission from the target position. The method may be performed at a receiver.

According to a third aspect of embodiments of the present invention, embodiments of the invention provide an apparatus for performing fractional subframe transmission. The apparatus may comprise: a first determining unit configured to in response to detecting that a channel becomes available, determine a target position from at least one potential position predefined in a subframe; and a performing unit configured to perform the fractional subframe transmission from the target position. The apparatus may be implemented at a transmitter.

According to a fourth aspect of embodiments of the present invention, embodiments of the invention provide an apparatus for performing fractional subframe transmission. The apparatus may comprise: a second determining unit configured to determine a target position from at least one potential position predefined in a subframe, the fractional subframe transmission starting at the target position; and a receiving unit configured to receive the fractional subframe transmission from the target position. The apparatus may be implemented at a receiver.

Other features and advantages of the embodiments of the present invention will also be apparent from the following description of specific embodiments when read in conjunction with the accompanying drawings, which illustrate, by way of example, the principles of embodiments of the invention.

BRIEF DESCRIPTION OF THE DRAWINGS

Embodiments of the invention are presented in the sense of examples and their advantages are explained in greater detail below, with reference to the accompanying drawings, where.

Throughout the figures, same or similar reference numbers indicate same or similar elements.

DETAILED DESCRIPTION OF EMBODIMENTS

Figure 1:
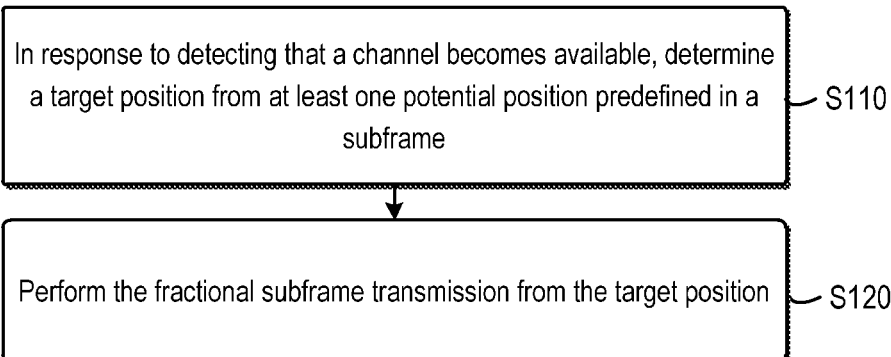
FIG. 1 illustrates a flow chart of a method 100 for performing fractional subframe transmission at a transmitter according to an embodiment of the invention.

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

Embodiments of the present invention are directed to a solution for performing fractional subframe transmission. The solution may be carried out between a receiver and a transmitter. In particular, upon detecting that a channel becomes available, the transmitter may determine a target position from at least one potential position predefined in a subframe and perform the fractional subframe transmission from the target position. The receiver may determine a target position from the at least one predefined potential position in a similar way and receive the fractional subframe transmission from the target position. In this way, transmission may be performed without introducing signalling overhead. Meanwhile, once a channel enters an idle state, the transmission may start from the current subframe, instead of the next subframe. As such, resource utilization is improved.

In embodiments of the present invention, a fractional subframe may refer to a subframe for downlink transmission or a subframe for uplink transmission, wherein one part of the fractional subframe is used for transmission of control information or data and the other part is not used for the transmission. For example, for a downlink subframe comprising 14 symbols, if only the last 6 symbols are available for in the downlink transmission while the first 8 symbols are unavailable, this subframe may be considered as a factional subframe.

In the disclosure, the fractional subframe transmission may refer to the transmission performed on one or more subframes, and at least one of the one or more subframes is a fractional subframe. By way of example, the fractional subframe transmission may comprise various cases, such as the first subframe being a fractional subframe, the last subframe being a fractional subframe, both the first and the last subframes being fractional subframes, and the like.

In some embodiments, the fractional subframe transmission may be downlink or uplink cellular transmission. In downlink transmission, the receiver may comprise user equipment (UE), such as a terminal, a Mobile Terminal (MT), a Subscriber Station (SS), a Portable Subscriber Station (PSS), Mobile Station (MS), or an Access Terminal (AT). Meanwhile, the transmitter may comprise a base station (BS), such as a node B (NodeB or NB), or an evolved NodeB (eNodeB or eNB). In uplink transmission, the transmitter may comprise a UE and the receiver may comprise a BS.

According to some other embodiments of the present invention, the fractional subframe transmission may be D2D transmission. In this regard, the receiver may be a Device-to-Device (D2D) receiver and the transmitter may be a D2D transmitter.

Embodiments of the present invention may be applied in various communication systems, including but not limited to a Long Term Evolution (LTE) system or a Long Term Evolution Advanced (LTE-A) system. Given the rapid development in communications, there will of course also be future type wireless communication technologies and systems with which the present invention may be embodied. It should not be seen as limiting the scope of the invention to only the aforementioned system.

Now some exemplary embodiments of the present invention will be described below with reference to the figures. Reference is first made to FIG. 1, which illustrates a flow chart of a method 100 for performing fractional subframe transmission at a transmitter according to an embodiment of the invention. The method 100 may be performed at a transmitter, such as a BS, a D2D transmitter, and other suitable device.

The method 100 starts at step S110, in which in response to detecting that a channel becomes available, a target position is determined from at least one potential position predefined in a subframe.

According to embodiments of the present invention, a subframe may comprise a plurality of symbols. By way of example, a subframe may be 1 ms and comprise 14 symbols, for example, symbols 0 to 13. A position, such as a potential position, a target position, a current position, a next position, may refer to a time point or a time period in the subframe. In some embodiments, a position may correspond to an instant in a subframe. As an alternative, a position may correspond to a symbol of a subframe. In this regard, the position may occupy a time period, for example, the time period of a symbol. In the context, a target position may refer to a position from which the fractional transmission may start, and a potential position may refer to a predefined position that is a candidate of the target position.

According to embodiments of the present invention, there may be one or more potential positions predefined in a subframe. Each of the potential positions may correspond to a symbol of the subframe periodically or aperiodically. In some embodiments, the potential positions may comprise every three symbols, for example, symbols 0, 3, 6, 9 and 12. For instance, the potential positions may be set at $$\mathrm{mod}(N, Nd) = x (x \in [0, Nd-1]), \quad (1)$$

where N represents the index of a symbol in a subframe, and Nd represents the interval between two potential positions and may be an integer ranged from 1 to the total number of symbols in the subframe, for example 14. According to equation (1), it may be determined that the smaller the Nd is, the denser the potential positions are. In some embodiments, each symbol in a subframe may be predefined as a potential position.

It is to be noted that the above examples are illustrated for example, rather than limitation. It can be appreciated that, in alternative embodiments, there may be aperiodic configurations of the potential positions. For instance, the potential positions may correspond to the symbols 0, 3, 8 and 12.

According to embodiments of the present invention, Clear Channel Assessment (CCA) or Extended Clear Channel Assessment (eCCA) may be performed. With the CCA/eCCA, the transmitter may detect whether a channel is available. In response to detecting that the channel becomes available, the transmitter may determine the target position from one or more potential positions in several ways. In some embodiments, whether a current position is a potential position is detected first. If the current position is a potential position, the potential position may be determined as the target position; otherwise, a channel occupation signal may be transmitted from the current position until a potential position and then the potential position may be determined as the target position.

At step S120, the fractional subframe transmission is performed from the target position.

According to embodiments of the present invention, at step S120, the transmitter may send an indicator at the target position to a receiver. The indicator may indicate a size of control information of the fractional subframe transmission, for example, the number of symbols of Physical Downlink Control Channel (PDCCH). In some embodiments, the indicator may be implemented as Physical Control Format Indicator Channel (PCFICH), or any other suitable indicator. Upon receiving the indicator, the receiver may know the size of the control information. For example, when the receiver detects PCFICH, it may have the knowledge of the number symbols of PDCCH. It is to be noted that the above example is shown only for illustration purpose, without suggesting any limitations on the scope of the subject matter described herein. As can be appreciated, in some embodiments, the control information may be configured by higher layer signaling or configured according to specification(s).

According to embodiments of the present invention, at step S120, the transmitter may determine the number of available symbols in the subframe based on the target position, and transmit control information and data of the fractional subframe transmission from the target position based on the number of the available symbols. In some embodiments, the control information may be transmitted on PDCCH, and the data may be transmitted on Physical Downlink Shared Channel (PDSCH). Details of the embodiments will be described with reference to FIG. 2.

According to embodiments of the present invention, the scheduling information associated with each of the potential position may be preconfigured in advance. When performing the fractional subframe transmission, the transmitter may obtain the preconfigured scheduling information associated with the target position, and perform the fractional subframe transmission based on the preconfigured scheduling information. As such, upon determining the target position, the transmitter does not have to spend much time on configuring scheduling information associated with the target position. In this way, the fractional subframe transmission may be performed more quickly and efficiently.

Figure 5:
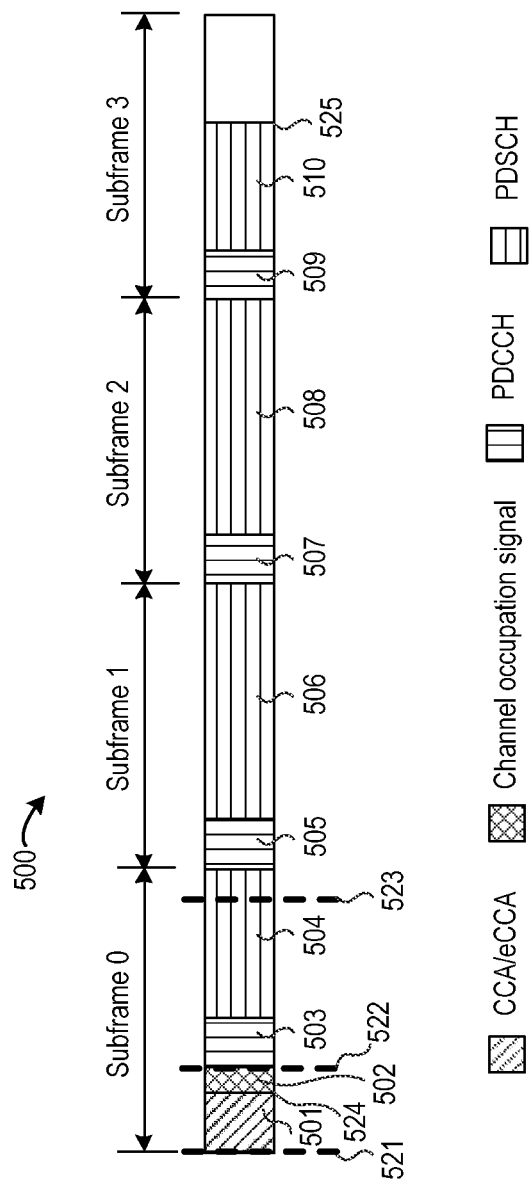
FIG. 5 illustrates a schematic diagram 500 of fractional subframe transmission according to embodiments of the invention.

FIG. 5 illustrates a schematic diagram 500 of fractional subframe transmission according to embodiments of the invention. FIG. 5 exemplarily shows four subframes, subframes 0 to 3. With respect to subframe 0, there are three potential positions 521, 522 and 523, wherein the first potential position 521 corresponds to the start of subframe 0, for example, symbol 0 of subframe 0. CCA/eCCA 501 may start from the first potential position 521. During the CCA/eCCA 501, the transmitter may determine that the channel is available at a position 524. Since the position 524 is not a potential position, the transmitter may transmit channel occupation signals from the position 524 until a potential position, for example, the potential position 522, and determine the potential position 522 as the target position. The factional subframe transmission then may start from the target position, wherein control information may be transmitted on PDCCH at time periods 503, 505, 507 and 509, and data may be transmitted on PDSCH at time periods 504, 506, 508 and 510.

Figure 2:
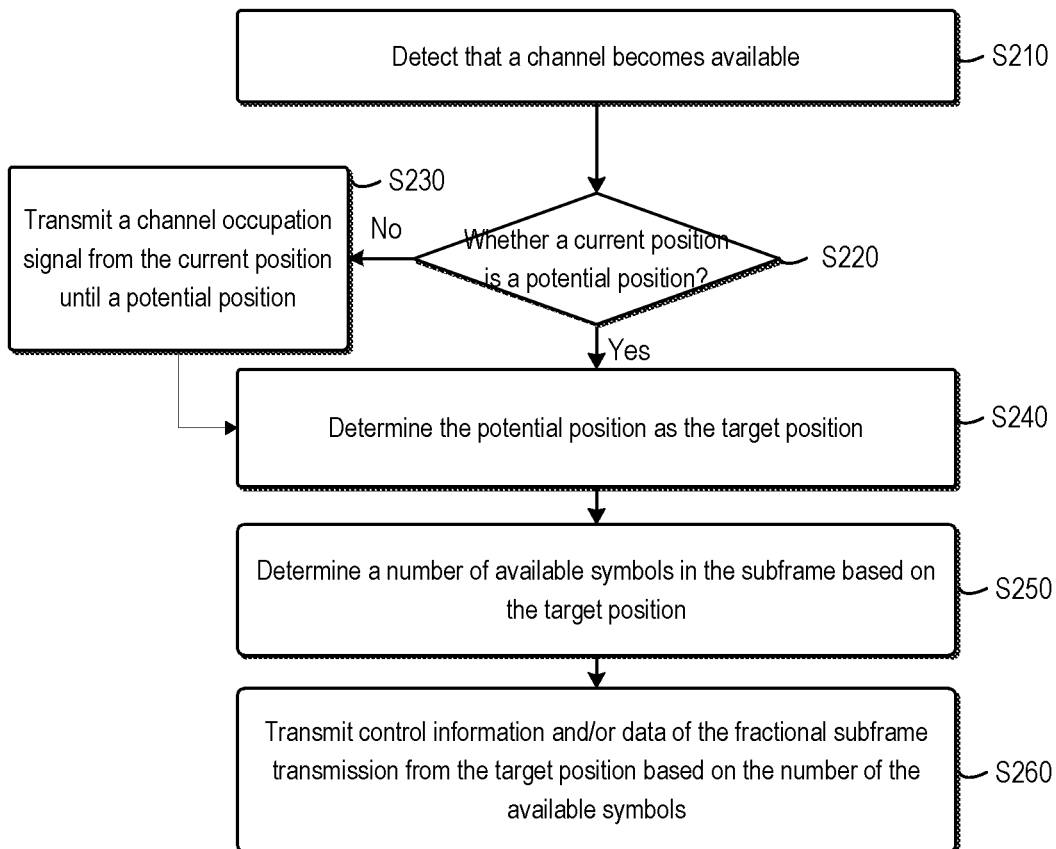
FIG. 2 illustrates a flow chart of a method 200 for performing fractional subframe transmission at a transmitter according to another embodiment of the invention.

Reference is now made to FIG. 2, which illustrates a flow chart of a method 200 for performing fractional subframe transmission at a transmitter according to another embodiment of the invention. The method 200 may be considered as a specific implementation of the method 100 described above with reference to FIG. 1. However, it is noted that this is only for the purpose of illustrating the principles of the present invention, rather than limiting the scope thereof.

Method 200 begins at step S210, in which a channel is detected as becoming available.

According to embodiments of the present invention, whether a channel is available may be detected in several ways, such as energy detection, carrier sensing, and so on. In some embodiments, strength of energy from a further transmitter may be measured on the channel. The further transmitter may be a transmitter that may use the same channel and is different from the transmitter performing the method according to embodiments of the present invention. If the energy strength is not strong, it may be determined that the channel is idle. In this regard, the energy strength may be compared with a strength threshold. In response to that the measured strength is less than the strength threshold, the channel may be determined as being available. The strength threshold may be a predetermined threshold, which may be set according to system requirements, specifications, channel quality, and so on. According to embodiments of the present invention, the strength threshold may be set as a fixed value or a value that is changed dynamically. It is to be understood that the above example embodiments are only for the purpose of illustration, without suggesting any limitations on the subject matter described herein. The strength threshold may be implemented in any other suitable ways.

Alternatively, the channel availability may be detected based on carrier sensing. By way of example, a signalling from a further transmitter may be detected on the channel. The further transmitter may be a transmitter that may use the channel and is different from the transmitter performing the method according to embodiments of the present invention. Based on the signalling, whether the channel is available may be determined.

It is to be noted although the above embodiments illustrate a further transmitter, there may be a plurality of further transmitters in a communication system according to embodiments of the present invention. In such embodiments, energy detection and carrier sensing may be performed with respect to the plurality of further transmitters.

At step S220, whether a current position is a potential position is detected.

If the current position is a potential position, the flow goes to step S240, where the potential position is determined as the target position. If the current position is not a potential position, the flow goes to step S230, where a channel occupation signal is transmitted from the current position until a potential position. Then, the flow goes to step S240, where the potential position is determined as the target position.

At step S250, a number of available symbols in the subframe are determined based on the target position.

In some embodiments, the number of available symbols may be determined based on the target position and the total number of symbols in a subframe. By way of example, if there are 14 symbols in one subframe, and if the target position corresponds to the sixth symbol, that is, symbol 5, it may be determined that there are 8 available symbols, i.e., symbols 6 to 13. For another example, if there are 12 symbols in one subframe, and if the target position corresponds to the eighth symbol, that is, symbol 7, it may be determined that there are 4 available symbols, i.e., symbols 8 to 11.

At step S260, control information and/or data of the fractional subframe transmission are transmitted from the target position based on the number of the available symbols.

In some embodiments, if the channel is available in earlier symbols of a subframe, for example, symbol 0 to 6, normal control information, for example normal PDCCH, may be applied. If the channel is available in latter symbols of a subframe, for example, symbol 9 to 13, shortened control information, for example shortened PDCCH, may be applied. In an exemplary embodiment, the normal PDCCH may occupy 3 symbols and the shortened PDCCH may occupy 1 or 2 symbols.

Additionally, in some embodiments, responsive to the number of the available symbols is less than or equal to a predetermined threshold, the transmitter may transmit the control information and the data in the available symbols of the subframe and a subframe immediately following the subframe. In an exemplary embodiment, if the number of the available symbols is equal to the size of the control information, the transmitter may transmit the control information in the available symbols of the subframe and transmit the data in a subframe immediately following the subframe. In a further exemplary embodiment, if the number of the available symbols is less than the size of the control information, the transmitter may transmit a first part of the control information in the available symbols of the subframe and a second part of the control information in a further subframe immediately following the subframe, wherein the first part and the second part constitute the control information. After the control information is transmitted, the transmitter may transmit the data in the further subframe. According to embodiments of the present invention, the predetermined threshold may be set as a fixed value or a value that is changed dynamically, and may be configured by high layer signalling or prescribed by specifications. In an exemplary embodiment, the predetermined threshold may be set as 3.

Figure 6:
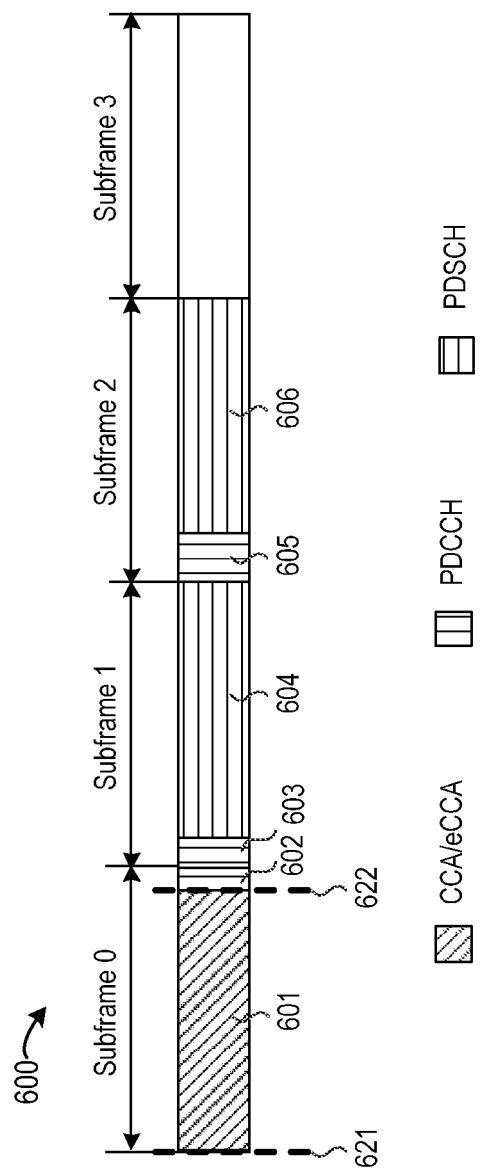
FIG. 6 illustrates a schematic diagram 600 of fractional subframe transmission according to embodiments of the invention.

FIG. 6 illustrates a schematic diagram 600 of fractional subframe transmission according to embodiments of the invention. FIG. 6 exemplarily shows four subframes, subframes 0 to 3. With respect to subframe 0, there are two potential positions 621 and 622. CCA/eCCA 601 may start from the first potential position 621. During CCA/eCCA 601, the transmitter may determine that the channel is available at the potential position 622. Thus, the potential position 622 may be determined as the target position. The factional subframe transmission then may start from the target position, wherein control information may be transmitted on PDCCH at time periods 602, 603 and 605, and data may be transmitted on PDSCH at time periods 604 and 606. As shown in FIG. 6, the control information is transmitted in the available symbols of the subframe 0 and its following subframe 1, corresponding to the time periods 602 and 603 respectively. After the control information, the data is transmitted at the time period 604. In particular, the first part of the control information is transmitted at the time period 602, and the second part of the control information is transmitted at the time period 603.

It is to be noted that, the factional subframe transmission may ends at a portion of a subframe or at a full subframe. According to embodiments shown in FIG. 5, the factional subframe transmission ends at a position 525. Thus, a portion of subframe 3 is used for the factional subframe transmission. In this case, both the first subframe (i.e., subframe 0) and the last subframe (i.e., subframe 3) are fractional subframes. Alternatively, as shown in FIG. 6, the factional subframe transmission terminates at the end of subframe 2. In other words, the factional subframe transmission ends at a full subframe.

Additionally, in some embodiments, a transport block size in the fractional subframe may be determined based on the number of the available symbols and the data of the transport block size may be transmitted in the subframe.

The transport block size indicates the size of a data block to be transmitted in the fractional subframe transmission. According to embodiments of the present invention, the transport block size may be determined in various ways. In some embodiments, the transmitter may determine a scaling factor associated with the number of the available symbols, and then determine the transport block size based on the scaling factor. The scaling factor may be defined in several ways. Table 1 illustrates an example of scaling factors associated with different numbers of available symbols.

TABLE 1

| Number of available symbols | Scaling factor |
| --- | --- |
| 1, 2, 3 | N/A |
| 4 | 0.25 |
| 5 | 0.25, 0.375 |
| 6 | 0.375 |
| 7 | 0.375, 0.5 |
| 8 | 0.5, 0.75 |
| 9, 10, 11, 12 | 0.75 |
| 13, 14 | 1 |

In some embodiments, if the number of the available symbols is 1, 2 or 3, the transmitter may use the available symbols to transmit control information of the fractional subframe transmission, and may determine that the available symbols are not enough for transmitting data after the transmission of the control information. In this regard, the scaling factor may be designed as a value of "N/A", which indicates that the scaling factor is "not available". In an exemplary embodiment, if the number of the available symbols is 4, the transmitter may determine that the associated scaling factor is 0.25. In an exemplary embodiment, if the number of the available symbols is 5, the transmitter may determine that the associated scaling factor is 0.25 or 0.375. In an exemplary embodiment, if the number of the available symbols is 6, the transmitter may determine that the associated scaling factor is 0.375. In an exemplary embodiment, if the number of the available symbols is 7, the transmitter may determine that the associated scaling factor is 0.375 or 0.5. In an exemplary embodiment, if the number of the available symbols is 8, the transmitter may determine that the associated scaling factor is 0.5 or 0.75. In an exemplary embodiment, if the number of the available symbols is 9, 10, 11 or 12, the transmitter may determine that the associated scaling factor is 0.75. In an exemplary embodiment, if the number of the available symbols is 13 or 14, the transmitter may determine that the associated scaling factor is 1.

In some embodiments, the transport block size may be determined based on the scaling factor in several ways. By way of example, a first resource block number which indicates a number of resource blocks allocated for transmission may be obtained. For the transmitter, the first resource block number may be determined by the transmitter in real time. Then, a second resource block number may be determined based on the first resource block number and the scaling factor. In an exemplary embodiment, the second resource block number may be determined as follows:

$$N_{PRB}=\max\{\lfloor N'_{PRB}\times\text{Factor}\rfloor,1\} \quad (2)$$

wherein $N'_{PRB}$ represents the first resource block number, $N_{PRB}$ represents the second resource block number, Factor represents the scaling factor.

Based on the second resource block number, the transport block size may be determined. In some embodiments, a transport block size table may be used for determining the transport block size. Table 2 illustrates an exemplary transport block size table.

TABLE 2

| MCS | 1 | 2 | 3 | 4 | 5 | 6 | 7 | 8 | 9 | 10 |
|---|---|---|---|---|---|---|---|---|---|---|
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | *1096* | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

The horizontal direction of Table 2 may correspond to a resource block number, for example, the second resource block number in the embodiments, and the vertical direction may correspond to a Modulation and Coding Scheme (MCS). In the embodiments, when the transmitter determines the second resource block number as well as the MCS that is employed currently, it may determine the transport block size by looking up the Table 2 based on the second resource block number and the MCS. By way of example, if the second resource block number is 8, and the MCS is 8 the transport block size may be determined as 1096.

It is to be noted that although the dimension of Table 2 is 10×27, it is simplification of 3GPP TS36.213 whose dimension is 34×110. It is further to be noted that the above example table is only for the purpose of illustration, without suggesting any limitations on the subject matter described herein. Any other suitable table may be used in the determination of the transport block size.

Figure 3:
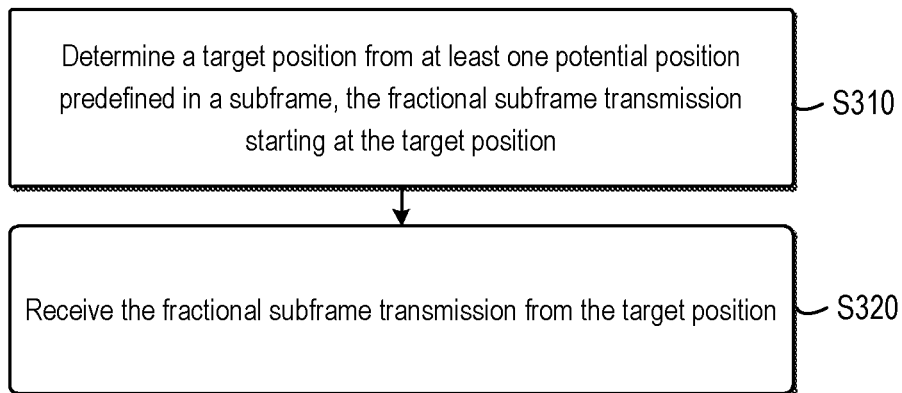
FIG. 3 illustrates a flow chart of a method 300 for performing fractional subframe transmission at a receiver according to an embodiment of the invention.

Reference is now made to FIG. 3, which illustrates a flow chart of a method 300 for performing fractional subframe transmission at a receiver according to an embodiment of the invention. The method 300 may be performed at a receiver, such as a UE, a D2D receiver, and other suitable device.

At step S310, a target position is determined from at least one potential position predefined in a subframe, the fractional subframe transmission starting at the target position.

According to embodiments of the present invention, there may be at least one potential position predefined in a subframe. In some embodiments, a plurality of potential positions may periodically correspond to symbols of the subframe, for example according to equation (1). Alternatively, there may be aperiodic configurations of the potential positions. For instance, the potential positions may correspond to the symbols 3, 8 and 12.

The target position indicates when the fractional subframe transmission starts. There may be several ways for the receiver to determine the target position based on one or more potential positions predefined in the subframe. In some embodiments, the transmitter may send an indicator at the target position to a receiver, wherein the indicator, for example PCFICH, may indicate a size of control information of the fractional subframe transmission. In this way, the target position may be indicated explicitly. For the receiver, it may detect the indicator at one of the at least one potential position, for example, denoted as potential position 1. In response to that the indicator is detected, the receiver may determine the one of the at least one potential position as the target position. Otherwise, the receiver may determine that this potential position is not the target position and carry out the same detection on a further potential position, for example potential position 2, and so on.

Alternatively, in some embodiments, the transmitter may not send the indicator. In this case, the receiver may make blind decoding for control information of the fractional subframe transmission at one of the at least one potential position. In response to that the blind decoding is success, the receiver may determine the one of the at least one potential position as the target position.

At step S320, the fractional subframe transmission is received from the target position.

In some embodiments, based on the indicator indicating the size of control information of the fractional subframe transmission, the receiver may know the size of the control information and accordingly receive the control information from the target position.

According to embodiments of the present invention, a number of available symbols in the subframe may be determined based on the target position, and the control information and data of the fractional subframe transmission may be received based on the number of the available symbols. In some embodiments, during the fractional subframe transmission, the control information may be transmitted before the data. In this case, the receiver may receive control information prior to the data. In some alternative embodiments, it is possible that the data is transmitted before the control information. As such, the receiver may receive the data prior to the control information. Details will be discussion with reference to embodiments of FIG. 4.

Figure 4:
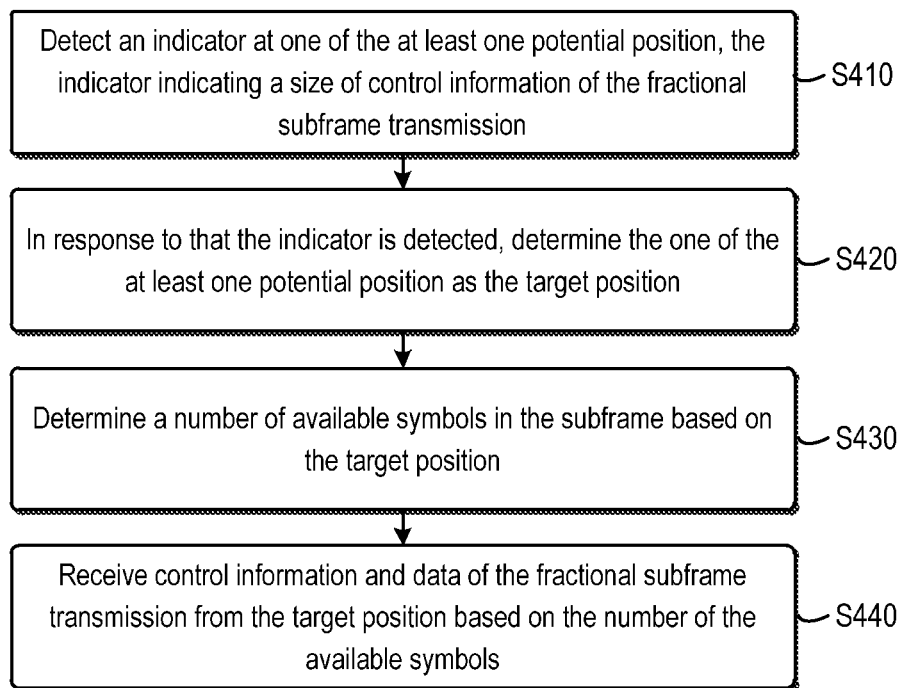
FIG. 4 illustrates a flow chart of a method 400 for performing fractional subframe transmission at a receiver according to another embodiment of the invention.

FIG. 4 illustrates a flow chart of a method 400 for performing fractional subframe transmission at a receiver according to another embodiment of the invention. The method 400 may be considered as a specific implementation of the method 300 described above with reference to FIG. 3. However, it is noted that this is only for the purpose of illustrating the principles of the present invention, rather than limiting the scope thereof.

At step S410, an indicator is detected at one of the at least one potential position, the indicator indicating a size of control information of the fractional subframe transmission.

In some embodiments, the transmitter may send an indicator, for example PCFICH, at the target position to a receiver, to indicate a size of control information of the fractional subframe transmission. In this case, the receiver may detect the indicator at one of the at least one potential position. At step S420, in response to that the indicator is detected, the one of the at least one potential position is determined as the target position. Otherwise, the receiver may detect the indicator at a further potential position.

At step S430, a number of available symbols in the subframe is determined based on the target position.

This step is similar to step S250. In some embodiments, the number of available symbols may be determined based on the target position and the total number of symbols in a subframe. By way of example, if there are 14 symbols in one subframe, and if the target position corresponds to the sixth symbol, that is, symbol 5, it may be determined that there are 8 available symbols, i.e., symbols 6 to 13. For another example, if there are 12 symbols in one subframe, and if the target position corresponds to the eighth symbol, that is, symbol 7, it may be determined that there are 4 available symbols, i.e., symbols 8 to 11.

At step S440, control information and data of the fractional subframe transmission are received based on the number of the available symbols.

In some embodiments, responsive to the number of the available symbols is less than or equal to a predetermined threshold, the receiver may receive the control information and the data in the available symbols and a subframe immediately following the subframe. In an exemplary embodiment, if the number of the available symbols is equal to the size of the control information, the receiver may receive the control information in the available symbols of the subframe and receive the data in a subframe immediately following the subframe. In a further exemplary embodiment, if the number of the available symbols is less than the size of the control information, the receiver may receive a first part of the control information in the available symbols of the subframe and a second part of the control information in a further subframe immediately following the subframe, wherein the first part and the second part constitute the control information. After the control information is received, the receiver may receive the data in the further subframe.

Additionally, in some embodiments, a transport block size in the subframe may be determined based on the number of the available symbols. Then, the data of the transport block size may be received in the subframe.

The transport block size indicates the size of a data block to be transmitted in the fractional subframe transmission. According to embodiments of the present invention, the transport block size may be determined in various ways. In some embodiments, the receiver may determine a scaling factor associated with the number of the available symbols, and then determine the transport block size based on the scaling factor. The scaling factor may be defined in several ways. As discussed above, Table 1 illustrates an example of scaling factors associated with different numbers of available symbols.

In an exemplary embodiment, if the number of the available symbols is 1, 2 or 3, the receiver may determine that there is no data transmitted and there is no need to determine the transport block size. In an exemplary embodiment, if the number of the available symbols is 4, the receiver may determine that the associated scaling factor is 0.25. In an exemplary embodiment, if the number of the available symbols is 5, the receiver may determine that the associated scaling factor is 0.25 or 0.375. In an exemplary embodiment, if the number of the available symbols is 6, the receiver may determine that the associated scaling factor is 0.375. In an exemplary embodiment, if the number of the available symbols is 7, the receiver may determine that the associated scaling factor is 0.375 or 0.5. In an exemplary embodiment, if the number of the available symbols is 8, the receiver may determine that the associated scaling factor is 0.5 or 0.75. In an exemplary embodiment, if the number of the available symbols is 9, 10, 11 or 12, the receiver may determine that the associated scaling factor is 0.75. In an exemplary embodiment, if the number of the available symbols is 13 or 14, the receiver may determine that the associated scaling factor is 1.

In some embodiments, the transport block size may be determined based on the scaling factor in several ways. By way of example, a first resource block number which indicates a number of resource blocks allocated for transmission may be obtained. For the receiver, the first resource block number may be notified by the transmitter. Then, a second resource block number may be determined based on the first resource block number and the scaling factor. In an exemplary embodiment, the second resource block number may be determined according to equation (2). Based on the second resource block number, the transport block size may be determined. In some embodiments, a transport block size table, for example Table 2, may be used for determining the transport block size. In particular, if the receiver determines the second resource block number as well as the MCS which is employed currently, it may determine the transport block size by looking up the Table 2.

Figure 7:
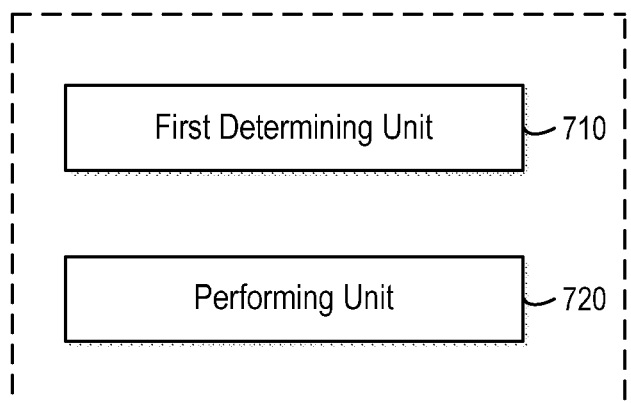
FIG. 7 illustrates a block diagram of an apparatus 700 for performing fractional subframe transmission according to embodiments of the invention.

FIG. 7 illustrates a block diagram of an apparatus 700 for performing fractional subframe transmission according to embodiments of the invention. In accordance with embodiments of the present invention, the apparatus 700 may be implemented at a transmitter, for example, a BS, a D2D transmitter or any other applicable device.

As shown, the apparatus 700 comprises: a first determining unit 710 configured to in response to detecting that a channel becomes available, determine a target position from at least one potential position predefined in a subframe; and a performing unit 720 configured to perform the fractional subframe transmission from the target position.

According to embodiments of the present invention, the first determining unit 710 may comprise: a potential position detecting unit configured to detect whether a current position is a potential position; and a first target position determining unit configured to responsive to that the current position is a potential position, determine the potential position as the target position, and responsive to that the current position is not a potential position, transmit a channel occupation signal from the current position until a potential position and determine the potential position as the target position.

According to embodiments of the present invention, each of the at least one potential position may correspond to a symbol of the subframe periodically or aperiodically.

According to embodiments of the present invention, the performing unit 720 may comprise: a sending unit configured to send an indicator at the target position, the indicator indicating a size of control information of the fractional subframe transmission.

According to embodiments of the present invention, the performing unit 720 may comprise: a first available symbol number determining unit configured to determine a number of available symbols in the subframe based on the target position; and a transmitting unit configured to transmit control information and data of the fractional subframe transmission from the target position based on the number of the available symbols.

In some embodiments, the transmitting unit may be further configured to: responsive to the number of the available symbols is less than or equal to a predetermined threshold, transmit the control information and the data in the available symbols and a subframe immediately following the subframe.

In some embodiments, the transmitting unit may comprise: a size determining unit configured to determine a transport block size in the subframe based on the number of the available symbols, wherein the transmitting unit may be further configured to transmit the data of the transport block size in the subframe.

According to embodiments of the present invention, the performing unit 720 may comprise: a scheduling information obtaining unit configured to obtain preconfigured scheduling information associated with the target position, wherein the performing unit may be further configured to perform the fractional subframe transmission based on the preconfigured scheduling information.

Figure 8:
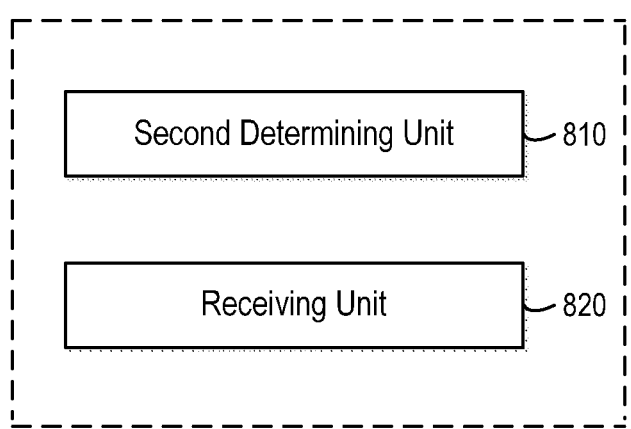
FIG. 8 illustrates a block diagram of an apparatus 800 for performing fractional subframe transmission according to embodiments of the invention.

FIG. 8 illustrates a block diagram of an apparatus 800 for performing fractional subframe transmission according to embodiments of the invention. In accordance with embodiments of the present invention, the apparatus 800 may be implemented at a receiver, for example, a cellular UE, a D2D receiver or any other applicable device.

As shown, the apparatus 800 comprises: a second determining unit 810 configured to determine a target position from at least one potential position predefined in a subframe, the fractional subframe transmission starting at the target position; and a receiving unit 820 configured to receive the fractional subframe transmission from the target position.

According to embodiments of the present invention, the second determining unit 810 may comprise: an indicator detecting unit configured to detect an indicator at one of the at least one potential position, the indicator indicating a size of control information of the fractional subframe transmission; and a second target position determining unit configured to in response to that the indicator is detected, determine the one of the at least one potential position as the target position.

According to embodiments of the present invention, the second determining unit 810 may comprise: a decoding unit configured to make blind decoding for control information of the fractional subframe transmission at one of the at least one potential position; and a third target position determining unit configured to in response to that the blind decoding is success, determine the one of the at least one potential position as the target position.

According to embodiments of the present invention, each of the at least one potential position may correspond to a symbol of the subframe periodically or aperiodically.

According to embodiments of the present invention, the receiving unit 820 may comprise: a second available symbol number determining unit configured to determine a number of available symbols in the subframe based on the target position, wherein the receiving unit may be further configured to receive control information and data of the fractional subframe transmission based on the number of the available symbols.

According to embodiments of the present invention, the receiving unit 820 may be further configured to responsive to the number of the available symbols is less than or equal to a predetermined threshold, receive the control information and the data in the available symbols and a subframe immediately following the subframe.

According to embodiments of the present invention, the receiving unit 820 may comprise: a size determining unit configured to determine a transport block size in the subframe based on the number of the available symbols, wherein the receiving unit may be further configured to receive the data of the transport block size in the subframe.

It is also to be noted that the apparatuses 700 and 800 may be respectively implemented by any suitable technique either known at present or developed in the future. Further, a single device shown in FIG. 7 or FIG. 8 may be alternatively implemented in multiple devices separately, and multiple separated devices may be implemented in a single device. The scope of the present invention is not limited in these regards.

It is noted that the apparatus 700 may be configured to implement functionalities as described with reference to FIGS. 1-2, and the apparatus 800 may be configured to implement functionalities as described with reference to FIGS. 3-4. Therefore, the features discussed with respect to the method 100 or 200 may apply to the corresponding components of the apparatus 700, and the features discussed with respect to the method 300 or 400 may apply to the corresponding components of the apparatus 800. It is further noted that the components of the apparatus 700 or the apparatus 800 may be embodied in hardware, software, firmware, and/or any combination thereof. For example, the components of the apparatus 700 or the apparatus 800 may be respectively implemented by a circuit, a processor or any other appropriate device. Those skilled in the art will appreciate that the aforesaid examples are only for illustration not limitation.

In some embodiment of the present disclosure, the apparatus 700 or the apparatus 800 may comprise at least one processor. The at least one processor suitable for use with embodiments of the present disclosure may include, by way of example, both general and special purpose processors already known or developed in the future. The apparatus 700 or the apparatus 800 may further comprise at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause the apparatus 700 to at least perform according to the method 100 or 200 as discussed above, or to cause the apparatus 800 to at least perform according to the method 300 or 400 as discussed above.

Based on the above description, the skilled in the art would appreciate that the present disclosure may be embodied in an apparatus, a method, or a computer program product. In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flowcharts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in FIGS. 1-4 may be viewed as method steps, and/or as operations that result from operation of computer program code, and/or as a plurality of coupled logic circuit elements constructed to carry out the associated function(s). At least some aspects of the exemplary embodiments of the disclosures may be practiced in various components such as integrated circuit chips and modules, and that the exemplary embodiments of this disclosure may be realized in an apparatus that is embodied as an integrated circuit, FPGA or ASIC that is configurable to operate in accordance with the exemplary embodiments of the present disclosure.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purpose of limitation.

What is claimed is:

1. A method performed by a user equipment (UE), the method comprising:
   acknowledging a plurality of possible starting positions of transmission in a first subframe of a downlink transmission burst on an unlicensed spectrum; and
   receiving, from a base station, the downlink transmission burst starting from a target position on the unlicensed spectrum, wherein,
   the target position is any one of the plurality of possible starting positions, and
   the plurality of possible starting positions corresponds to a plurality of positions, in the first subframe, that are mutually spaced with an interval of a duration of a plurality of symbols.

2. The method of claim 1, wherein the plurality of positions includes symbol 0 in the subframe.

3. The method of claim 1, wherein the downlink transmission burst ends at a symbol of a subframe with symbols occupied and other symbols not occupied.

4. The method of claim 1, wherein the downlink transmission burst starts in response to the base station detecting that a channel on the unlicensed spectrum is idle.

5. The method of claim 1, wherein control information is received at the target position.

6. A method performed by a base station, the method comprising:
   acknowledging a plurality of possible starting positions of transmission in a first subframe of a downlink transmission burst on an unlicensed spectrum; and
   transmitting, to a user equipment (UE), the downlink transmission burst starting from a target position on the unlicensed spectrum, wherein,
   the target position is any one of a plurality of possible starting positions, and
   the plurality of possible starting positions corresponds to a plurality of positions, in the first subframe, that are mutually spaced with an interval of a duration of a plurality of symbols.

7. The method of claim 6, wherein the plurality of positions includes symbol 0 in the subframe.

8. The method of claim 6, wherein the downlink transmission burst ends at a symbol of a subframe with symbols occupied and other symbols not occupied.

9. The method of claim 6, wherein the downlink transmission burst starts in response to the base station detecting that a channel on the unlicensed spectrum is idle.

10. The method of claim 6, wherein control information is transmitted at the target position.

11. A user equipment (UE), the UE comprising a receiver configured to:

acknowledge a plurality of possible starting positions of transmission in a first subframe of a downlink transmission burst on an unlicensed spectrum; and receive, from a base station, the downlink transmission burst starting from a target position on the unlicensed spectrum, wherein, the target position is any one of the plurality of possible starting positions, and the plurality of possible starting positions corresponds to a plurality of positions, in the first subframe, that are mutually spaced with an interval of a duration of a plurality of symbols.

12. The UE of claim 11, wherein the plurality of positions includes symbol 0 in the subframe.

13. The UE of claim 11, wherein the downlink transmission burst ends at a symbol of a subframe with symbols occupied and other symbols not occupied.

14. The UE of claim 11, wherein the downlink transmission burst starts in response to the base station detecting that a channel on the unlicensed spectrum is idle.

15. The UE of claim 11, wherein control information is received at the target position.

\* \* \* \* \*